(No Model.) 2 Sheets—Sheet 1.

P. G. HUBERT.
WATER CLOSET.

No. 393,109. Patented Nov. 20, 1888.

Witnesses:
Joseph W. Roe.
C. Lundgren.

Inventor:
Philip Geugembre Hubert
by his Attys
Brown & Hall (No Model.) 2 Sheets—Sheet 2.
P. G. HUBERT.
WATER CLOSET.
No. 393,109. Patented Nov. 20, 1888.

Witnesses:
Joseph W. Roe.
C. E. Sundgren.

Inventor:
Philip Gengembre Hubert
by his Atty
Brown & Hall

UNITED STATES PATENT OFFICE.

PHILIP G. HUBERT, OF NEW YORK, N. Y.

WATER-CLOSET.

SPECIFICATION forming part of Letters Patent No. 393,109, dated November 20, 1888.

Application filed January 6, 1888. Serial No. 259,958. (No model.)

*To all whom it may concern:*

Be it known that I, PHILIP GENGEMBRÉ HUBERT, of the city and county of New York, in the State of New York, have invented a new and useful Improvement in Water-Closets, of which the following is a specification.

Figure 1:
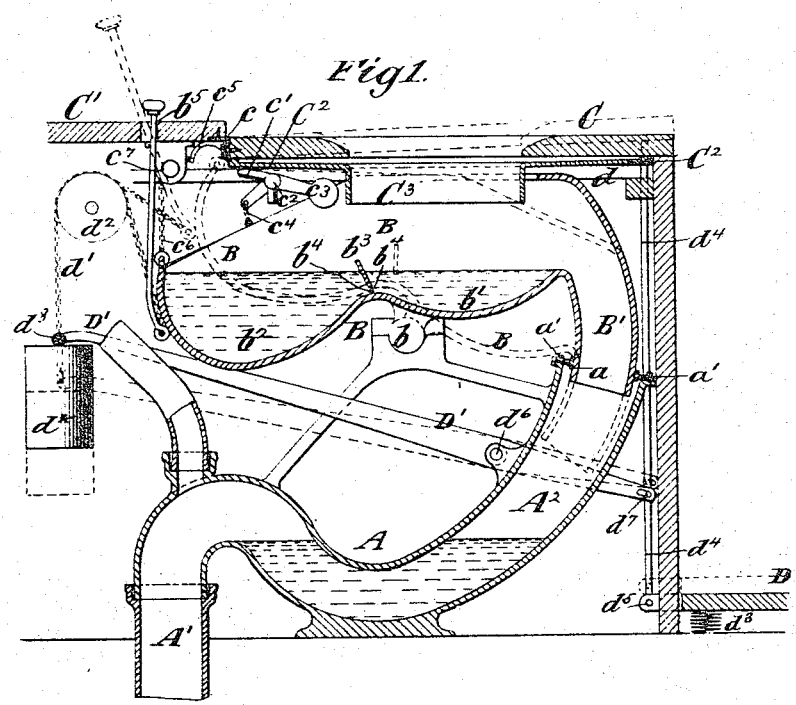
Figure 2:
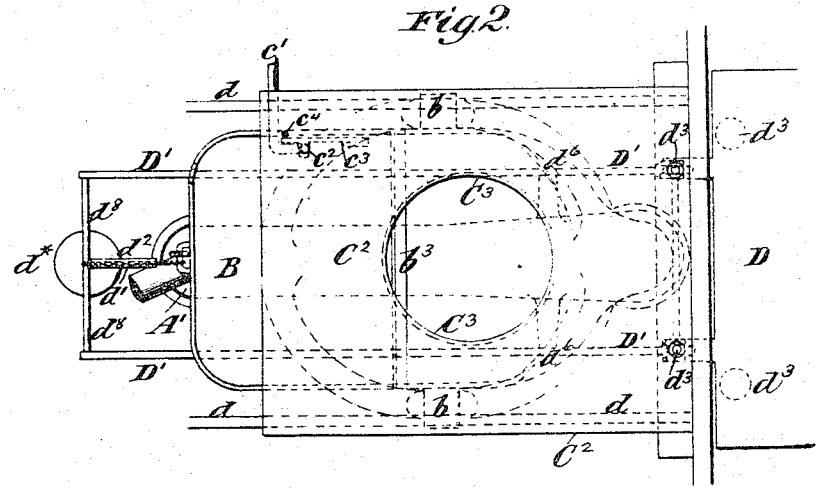
Figure 3:
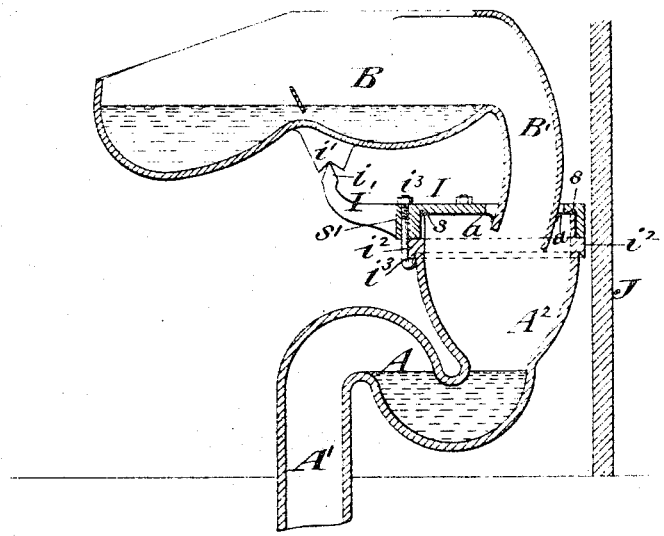
Figure 4:
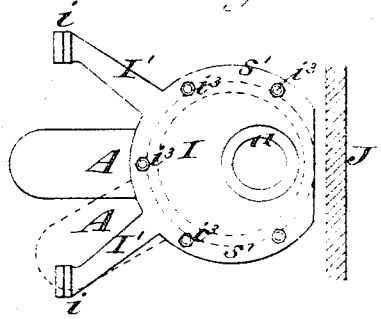

In the accompanying drawings, Figure 1 is a vertical section of a water-closet having a pivoted or tilting basin. Fig. 2 is a plan of the same, the seat and the top board to which it is hinged being removed. Fig. 3 is a vertical section of a trap and basin or bowl having its trunnion-bearing supported by a cap or flange applied to the mouth of the trap. Fig. 4 is a plan of the parts shown in Fig. 3, the basin or bowl being omitted.

Similar letters of reference designate corresponding parts in all the figures.

Referring first to Figs. 1 and 2, A designates a trap from which leads the soil-pipe A', and which has an upwardly-presented branch or throat, A².

B designates the basin or bowl of the closet, which is supported by pivots or trunnions $b$, and which has a discharge-nozzle B'. This discharge-nozzle is curved or arc-shaped concentric with the pivots or trunnions $b$, and as the basin or bowl B is swung upon its pivots or trunnions the discharge-nozzle B' works downward into the branch A² of the trap and discharges the contents of the basin or bowl thereinto.

I provide between the discharge-nozzle B and the branch A² of the trap an elastic packing, which not only prevents the water from overflowing from the top of the trap in case the trap shall become clogged, but also forms a yielding resistance device to slightly impede the swinging of the basin or bowl B upon its trunnions, and thus prevent the basin or bowl from dropping backward suddenly after it has been emptied, and thereby entailing liability of breakage. As here represented, this elastic packing consists of a ring, $a$, of india-rubber or analogous soft and yielding material, which is clamped to the upper end of the throat A² by a washer, a', and which has an opening slightly smaller than the discharge-nozzle B'. Consequently this packing $a$ will hug the exterior of the discharge-nozzle and will tightly close the throat A² around the discharge-nozzle.

The basin or bowl B is so formed as to constitute at its forward part a soil receptacle or cavity, b', and behind the soil receptacle or cavity a clean-water or flushing reservoir or cavity, b². These two cavities are separated by a partition, b³, which extends across the basin or bowl and which has below its lower edge a restricted opening, b⁴, through which the water may flow from the clean-water reservoir or cavity b² when the basin or bowl is tilted. The partition b³ extends only a short distance above the normal level of water in the closet, as clearly shown in Fig. 1, and consequently, when the basin or bowl is tilted and after the contents of the soil-cavity b' is discharged through the nozzle B', the clean water in the flushing-cavity b² not only flows through the opening b⁴ beneath the partition, but flows or falls over the top of the partition, and thereby has a better effect in cleaning the soil-cavity, b'.

C designates the seat, which is hinged at $c$ to the top board, C', covering the back of the closet, and below the seat is a drip-tray, C², which is supported by rails or bearers $d$, forming a part of the wood frame or covering of the closet and extending on opposite sides of the basin or bowl. The drip-tray C² differs from those ordinarily used in closets in having a downwardly-extending throat or flange, C³, which is substantially concentric with the opening in the seat C, and which extends downward for a considerable distance into the basin or bowl B. When the basin or bowl B is in its normal position, as shown in Fig. 1, its top fits or extends upward nearly to the seat C; but when it is tilted a considerable space or opening is left or exposed between the under side of the seat and the top of the closet, and a long downwardly-extending throat or flange, C³, upon the drip-tray conceals this opening and black space and greatly improves the appearance of the closet.

The flange or throat C³ is not deep enough to extend down to the water-level, but is in any case sufficiently long to project well downward below the top of the basin or bowl B, and thus prevent a person from seeing between the seat and the top of the basin or bowl when the latter is tilted.

In closets designed for use in hotels and other public places it is desirable that the basin or bowl B shall be tilted automatically after use, in order to insure its emptying even though the person using it be neglectful. The basin or bowl B has its center of gravity considerably behind the trunnions $b$, on which it swings, and I apply to the back end of the basin or bowl a weight, $d^3$, connected with the basin or bowl by a chain or flexible connection, $d'$, passing over a pulley, $d^2$. This weight $d^3$ is sufficient to tilt the closet into discharging position and to cause its automatic discharge after use. In order that the weight $d^3$ may be lifted and the basin B be relieved therefrom and caused to return to horizontal position preparatory to use, I employ a platform, D, which is supported by springs $d^4$, and I also support the seat C normally in a slightly-elevated position by vertical rods $d^4$, which are connected with rearwardly-extending ears $d^5$ on the platform D. At opposite sides of the trap A are levers D', which are fulcrumed at $d^6$, and which have their forward ends connected at $d^7$ with the vertical rods $d^4$. The rear ends of these levers D' are connected by a rod, $d^8$, which passes through an eye in the chain $d'$ and is connected with the weight $d^3$. So long as the closet is not in use the weight $d^3$, combined with the force of the springs $d^4$, applied under the platform D, is sufficient to hold the basin or bowl B in a tilted position, as shown by dotted line; but when a person steps upon the platform, and afterward when he sits upon the seat C, both the platform and seat will be held in depressed position, and by lifting the rear ends of the lever D' will lift the weight $d^3$ and permit the basin or bowl B to return to the position of use shown by full lines in Fig. 1.

The water for the flushing-cavity $b^2$ is supplied from a pipe, $c'$, under control of a cock, $c^2$, and applied to the plug of this cock is a weighted lever, $c^3$, which, by a flexible connection, $c^4$, is attached to the basin or bowl B. So long as the basin or bowl remains in its tilted position the weighted lever $c^3$ will maintain the plug of the cock turned to closing position; but as soon as the weight $d^3$ has been raised by a person standing on the platform D the return of the basin or bowl B to its operative position will turn the cock $c^2$ and permit the bowl to fill with water. As a person leaves the platform D after using the closet the weight $d^3$ again comes upon the rear end of the basin or bowl and tilts it automatically to discharging position. Obviously, with this construction, the water would continue to run from the pipe $c'$ so long as a person was sitting upon the closet, and where economy in the use of water is necessary the water may be admitted under control of a cock actuated by a float, as in my former patent.

In closets designed for house use the movable platform and the depressible seat and connections through which they operate to lift the weight $d^3$ will not usually be employed, and where they are not the basin or bowl B may be tilted by an ordinary handle, $b^5$, connected therewith, although the weight $d^3$ may still be employed to partially balance the bowl, although not sufficiently to tilt it unless the handle $b^5$ is raised.

As is well known it is common in house-closets to lift the seat C and pour slops from a pail into the closet. When the partition $b^3$ projects but slightly above the level of the water, as shown, there is a liability of slops swashing or being poured over it and into the flushing-receptacle $b^2$, thereby contaminating the clean water therein. To prevent this I prefer to connect the seat C with the basin or bowl, so that when the seat is lifted or turned back the basin or bowl will be tilted slightly and the partition $b^3$ thereby caused to project to a greater distance above the level of water therein. I have shown an arm, $c^5$, as projecting rearwardly from the seat C and as connected with the closet by a chain, $c^6$, passing over a pulley, $c^7$. By this connection when the seat C is raised the bowl B is slightly tilted, and slops may be poured into it without liability of mingling with the clean water in the cavity $b^2$.

When the bearings for the trunnions $b$ of the closet bowl or basin B are formed upon or secured to the body of the trap A, as shown in Figs. 1 and 2, the trap must extend rearward substantially in the same vertical plane with the bowl or basin; but sometimes this is impossible, owing to the location of the soil-pipe. I may therefore employ the construction shown in Figs. 3 and 4. In that construction a cap or flange, I, is applied to the top of the trap and has arms I', which support knife-edged bearings $i$, on which rest notches $i'$, formed on the bowl B. On the trap is formed a projecting flange, $i^2$, the under side of which is beveled or undercut, and the cap I is held securely in place by hook-bolts $i^3$, which engage this flange $i^2$. The cap I is formed with a circular groove, $s$, receiving the end of the trap, and the rubber packing $a$ is then clamped between the end of the trap and the cap. The flange $s'$ on the cap I does not project at the front of the cap, but has sufficient lateral projection at the sides and back to receive the bolts $i^3$. Therefore the front J of the closet-casing may be brought close to the trap, as shown. This arrangement of the cap I for supporting the basin or bowl provides for setting the basin or bowl at any desired angle relatively to the trap, as indicated by the dotted lines in Fig. 4.

What I claim as my invention, and desire to secure by Letters Patent, is—

1. The combination of a tilting basin, comprising a soil-receptacle and a clean-water receptacle, a bridge or partition separating the said receptacles and beneath which said receptacles communicate, a discharge-nozzle on said soil-receptacle, a soil-pipe into which said nozzle extends, a hinged seat, a lever, and a connection between said hinged seat and the lever for causing the rocking of the basin in one direction, substantially as specified.

2. The combination, with a water-closet basin containing a soil-receptacle and a clean-water receptacle separated by a partition, below which they communicate and having a discharge-nozzle leading from the soil-receptacle, the basin being supported by pivots or trunnions, which are forward of its center of gravity, of a weight applied to the basin for counterbalancing the preponderance of weight in rear of its pivots, substantially as herein described.

3. The combination, with a soil-pipe, of a tilting or pivoted bowl, B, containing the soil-receptacle with a discharge-nozzle and the clean-water receptacle in rear thereof, the two being separated by the partition $b^3$, affording a restricted opening below it, a balance-weight applied to the bowl for holding it normally in tilted position, and a movable platform and seat and connections through which they act when depressed by the weight of a person on them, to relieve the bowl of the balance-weight and permit it to return to a position for use, substantially as described.

4. The combination, with a trap or soil-pipe and the tilting water-closet basin or bowl having a discharge-nozzle entering the trap or pipe, of a cap secured upon the receiving end of the trap or pipe and adjustable circumferentially thereon, said cap having projecting arms which carry the bearings for supporting the tilting basin or bowl, substantially as herein described.

P. G. HUBERT.

Witnesses:
 C. HALL,
 FREDK. HAYNES.